3,396,172
ANTHRAQUINONE DYES CONTAINING
PYROMELLITAMIDE GROUPS
Willy Braun, Heidelberg, and Ernst Schefczik, Ludwigshafen (Rhine), Germany, assignors to Badische Anilin- & Soda-Fabrik Aktiengesellschaft, Ludwigshafen (Rhine), Germany
No Drawing. Filed Dec. 28, 1965, Ser. No. 517,067
Claims priority, application Germany, Jan. 2, 1965,
B 79,973
4 Claims. (Cl. 260—326)

ABSTRACT OF THE DISCLOSURE

This invention relates to dyes of the formula

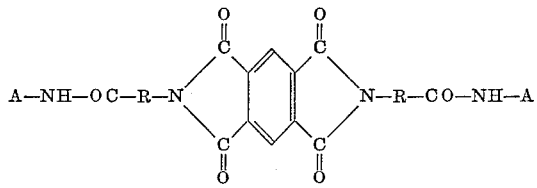

wherein R denotes an alkylene group having one to five carbon atoms or one of the groups:

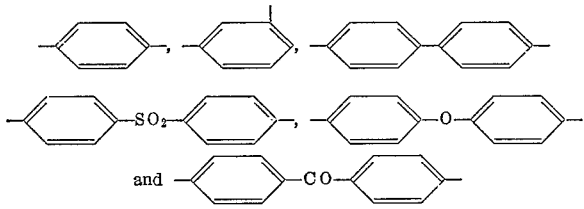

and A denotes the radical of an anthraquinone dye which is free from sulfonic acid groups.

---

The present invention relates to new dyes having the general Formula I:

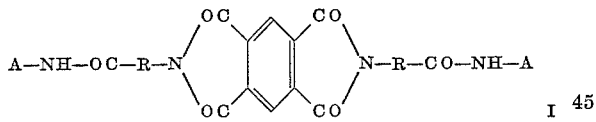

in which A denotes the radical of an anthraquinone dye which is free from sulfonic acid groups and R denotes an alkylene group having one to five carbon atoms or one of the groups:

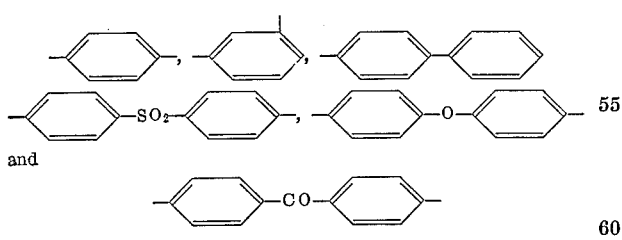

and

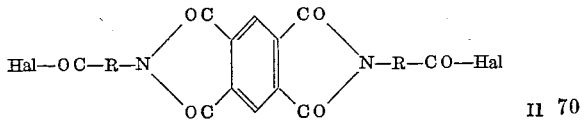

These dyes are insoluble in water and organic solvents and have very good fastness properties.

The new dyes may be obtained by reacting both of the halogen atoms of an acid halide having the general Formula II:

Hal—OC—R—N⟨ ⟩N—R—CO—Hal   II in which Hal denotes a chlorine atom or a bromine atom and R has the above meaning with an anthraquinone dye which contains a primary amino group but no sulfonic acid groups with the formation of an amide by a conventional method.

The new dyes are free from sulfonic acid groups but may contain substituents, such as hydroxyl groups, halogen atoms, nitro groups, alkyl groups, aryl groups, alkoxy groups, aryloxy groups and acylamino groups (which in turn may bear substituents) in the dye radical A. Anthraquinone dyes to be used as starting materials may be derived from anthraquinone itself or from more highly condensed anthraquinone derivatives, such as those of the benzanthrone, dibenzanthrone, isodibenzanthrone, pyrazolanthrone, anthrapyrimidine, anthraquinacridone, pyranthrone, indanthrone, flavanthrone and perylene tetracarboxylic imide series.

The dye radical may also be for example an anthraquinone compound which contains azo groups.

New dyes having the Formula I in which the carbamoyl group —CO—NH— is attached directly to an aromatic nucleus of the dye radical A and R denotes an arylene group are of particular industrial interest.

The initial dyes $ANH_2$ required for the production of the new dyes thus contain a primary amino group but not any sulfonic acid groups. The following compounds may for example be specified:

1-aminoanthraquinone,
1-amino-5-benzoylaminoanthraquinone,
1-amino-4-benzoylaminoanthraquinone,
1-amino-8-benzoylaminoanthraquinone,
1-amino-5-(p-chlorobenzoylamino)-anthraquinone,
1-amino-4-(p-cyanobenzoylamino)-anthraquinone,
4-aminoanthrapyrimidine-(1,9),
1-amino-4-hydroxyanthraquinone,
1-amino-5-benzoylamino-4,8-dihydroxyanthraquinone,
1-amino-4-phenylmercaptoanthraquinone,
Bz-1-aminobenzanthrone,
2-aminobenzanthrone.

or the compounds:

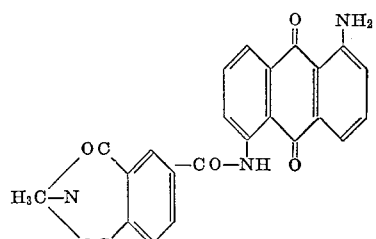

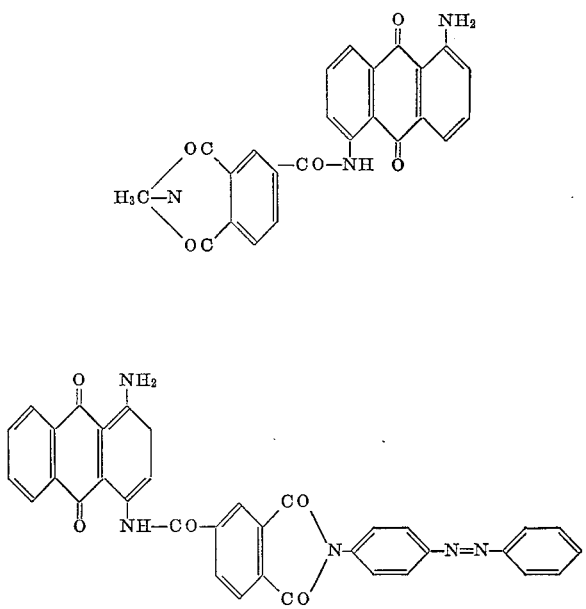

and

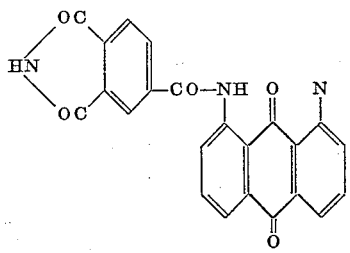

In order to prepare the dyes of this invention, the said dyes containing a primary amino group are reacted with acid halides having the general Formula II. In this formula R denotes an alkylene group which contains 1 to 5 carbon atoms, such as a methylene group or an alkylene group consisting of two, three, four or five methylene groups, or an arylene group, such as a 1,4-phenylene group, a 1,3-phenylene group, or an arylene group having one of the formulae:

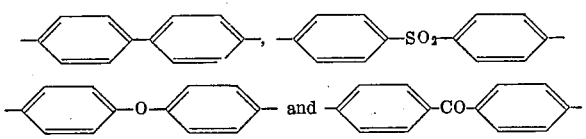

Acid halides having the general Formula II may be obtained for example by conventional methods, for example by reaction with thionyl chloride, thionyl bromide or with phosgene, from imides which can be prepared by condensation of pyromellitic acid or pyromellitic anhydride with the appropriate aliphatic or aromatic amino acids. The preferred acid halides are the acid chlorides.

The said initial dyes containing amino groups are reacted with the acid halides so that a hydrogen atom of the amino group is replaced by an acyl radical of the acid halide. The procedure is that at least twice the molar amount of the initial dye is used with respect to one mole of acid halide. The reaction is advantageously carried out in a solvent at temperatures of 70° to 260° C., preferably 100° to 220° C. Solvents are used which do not react in an undesirable way with the reactants under the reaction conditions. The following are examples of suitable solvents: nitrobenzene, naphthalene, diphenyl oxide, diphenylene oxide, dichlorobenzene, trichlorobenzene and N-methylpyrrolidone. Reactions which proceed slowly may be accelerated by adding a small amount of a tertiary amine, such as pyridine. When the reaction is over, the dye is suction filtered while hot and freed from excess dye amine by washing or boiling with solvents or if necessary by extraction.

The new dyes are pigments having outstanding fastness to solvents and light. They may be used in pastes, flush pastes, formulations, printing inks, distempers, binder colors and lakes of all types. They may also be incorporated into synthetic or natural macromolecular substances, such as polyvinyl chloride, polystyrene, polyamides, polyethylene, polypropylene, polyesters, phenoplasts, aminoplasts and rubber. Moreover the new pigments may be used for mass coloration of fibers of acetyl cellulose, polyacrylonitrile, polyesters, polyurethanes and polyvinyl chloride. They are also suitable for mass coloration of paper or for coloring inorganic matrials, as for example cement.

The invention is further illustrated by the following examples in which parts are by weight unless otherwise stated. Parts by weight bear the same relation to parts by volume as the liter to the kilogram.

Example 1

49.0 parts of 1-aminoanthraquinone is dissolved in 600 parts of anhydrous o-dichlorobenzene. 36.9 parts of the acid chloride having the formula:

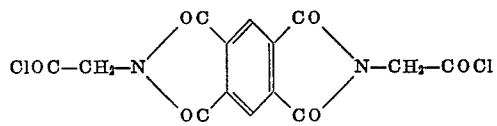

is added thereto and the whole is boiled under reflux for eight hours, and then allowed to cool to room temperature. The dye is suction filtered, washed with dimethylformamide and then with alcohol and dried. 63 parts of the yellow dye having the formula:

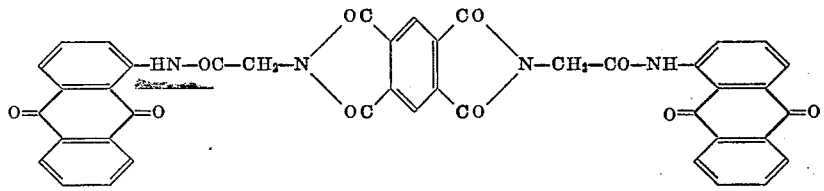

is obtained.

Example 2

75.0 parts of 1-amino-5-benzoylaminoanthraquinone is dissolved in 800 parts of anhydrous trichlorobenzene. 48.1 parts of the acid chloride having the formula:

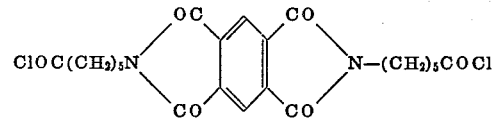

is introduced into the solution and the whole is boiled under reflux for six hours. The product is suction filtered at 60° C., washed with dimethylformamide and with alcohol and dried. 98 parts of the reddish yellow dye having the formula:
is obtained.

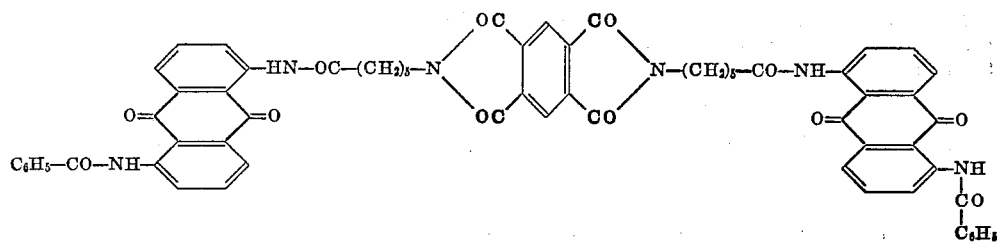

Example 3

76 parts of 1-amino-5-benzoylaminoanthraquinone is dissolved in 2600 parts of anhydrous nitrobenzene. At about 100° C., 49.3 parts of the acid chloride having the formula:

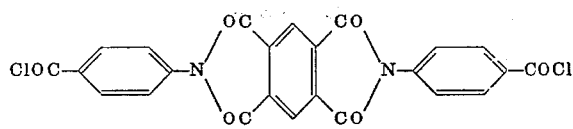

is added and the whole is boiled under reflux for eight hours. 5 parts of pyridine is then added and the whole is boiled for another sixteen hours. The product is suction filtered at from 100° to 110° C. and the filter cake is extracted with dimethylformamide in a hot extracter until the discharge is colorless. The product is then washed with alcohol and dried. 104 parts of the reddish yellow dye having the formula:

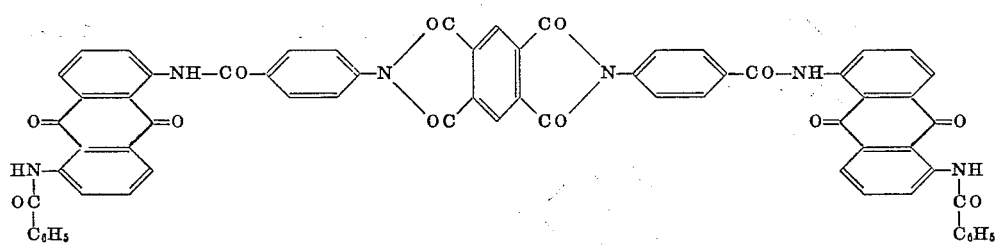

is obtained.

The following dyes are obtained in an analogous way from the acid chloride used in the last example and the following dye amines:

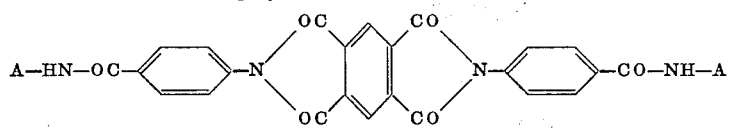

| Example | ANH$_2$ | Temp., °C. | Solvent | Time, hrs. | Color |
|---|---|---|---|---|---|
| 4 | (1-amino anthraquinone) | 210 | Trichlorobenzene | 6 | Yellow. |
| 5 | (1-amino-5-chloroanthraquinone) | 210 | ...do... | 6 | Do. |
| 6 | (1-amino-8-chloroanthraquinone) | 210 | ...do... | 6 | Do. |
| 7 | (1-amino-4-hydroxyanthraquinone) | 210 | ...do... | 6 | Orange. |
| 8 | (1-amino-5-methoxyanthraquinone) | 210 | ...do... | 6 | Do. |

| Example | ANH₂ | Temp., °C. | Solvent | Time, hrs. | Color |
|---|---|---|---|---|---|
| 9 | (1-amino-4-benzamido anthraquinone) | 210 | ...do... | 12 | Claret. |
| 10 | (1,8-diamino-4-benzamido anthraquinone derivative) | 210 | ...do... | 8 | Yellow. |
| 11 | (1-amino-8-phthalimido anthraquinone derivative) | 210 | Nitrobenzene | 12 | Do. |
| 12 | (aminoanthraquinone pyrazine derivative) | 210 | ...do... | 12 | Do. |
| 13 | (aminobenzanthrone) | 250 | Diphenylether | 16 | Greenish yellow. |
| 14 | (1-(4-chlorobenzamido)-5-amino anthraquinone) | 210 | Nitrobenzene | 16 | Yellow. |
| 15 | (1-(3-chlorobenzamido)-5-amino anthraquinone) | 210 | ...do... | 16 | Do. |
| 16 | (1-(2,5-dichlorobenzamido)-5-amino anthraquinone) | 210 | ...do... | 16 | Do. |

| Example | ANH₂ | Temp., °C. | Solvent | Time, hrs. | Color |
|---|---|---|---|---|---|
| 17 | 1-(2,4,5-trichlorobenzamido)-5-aminoanthraquinone | 210 | ...do... | 16 | Do. |
| 18 | 1-(4-methylbenzamido)-5-aminoanthraquinone | 210 | ...do... | 16 | Do. |
| 19 | 1-(4-methoxybenzamido)-5-aminoanthraquinone | 210 | ...do... | 16 | Do. |
| 20 | 1-(2-chloro-4-methoxybenzamido)-5-aminoanthraquinone | 210 | ...do... | 16 | Do. |
| 21 | 1-amino-4,5-dihydroxy-8-benzamidoanthraquinone | 210 | ...do... | 12 | Violet. |

Example 22

100 parts of 1-aminoanthraquinone is dissolved in 1500 parts of anhydrous trichlorobenzene. 98.6 parts of the acid chloride having the formula:

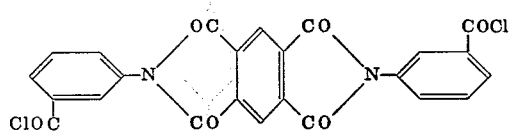

is added and the whole is boiled under reflux for four hours. 10 parts of pyridine is added and boiling is continued for another eight hours. The product is suction filtered at about 80° C. The filtered material is boiled up with dimethylformamide and washed with alcohol. It is then dried. 161 parts of the yellow dye having the formula:

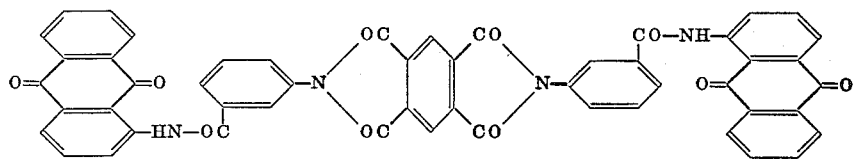

is obtained.

We claim:
1. A dye having the formula

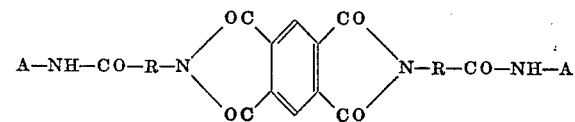

wherein:
R represents a divalent radical selected from the class consisting of alkylene of 1 to 5 carbon atoms,

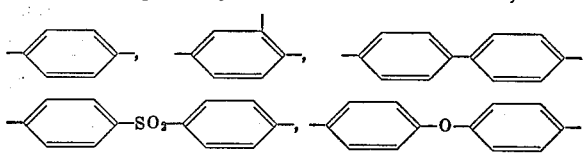

and

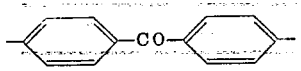

A represents a dye radical selected from the class consisting of anthaquinonyl, anthrapyrimidinyl, benzanthronyl and anthraquinonyl substituted by chloro, hydroxy, methoxy, phenylmercapto, benzoylamino or benzoylamino bearing chloro, methyl, methoxy, cyano or dicarboxy imide substitutes on the benzene ring.

2. The dye having the formula:

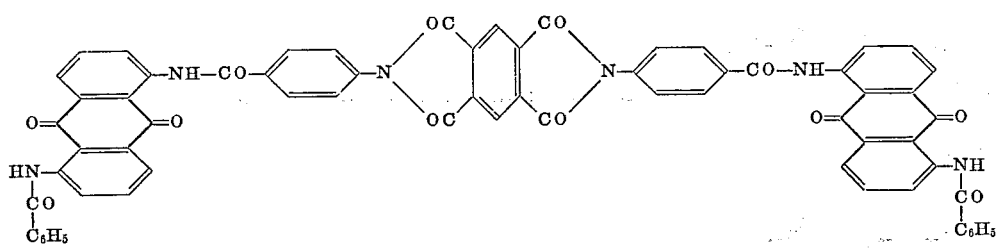

3. The dye having the formula:

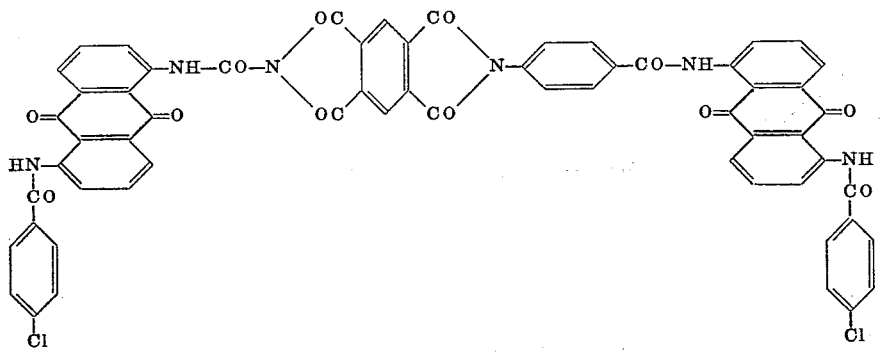

4. The dye having the formula:

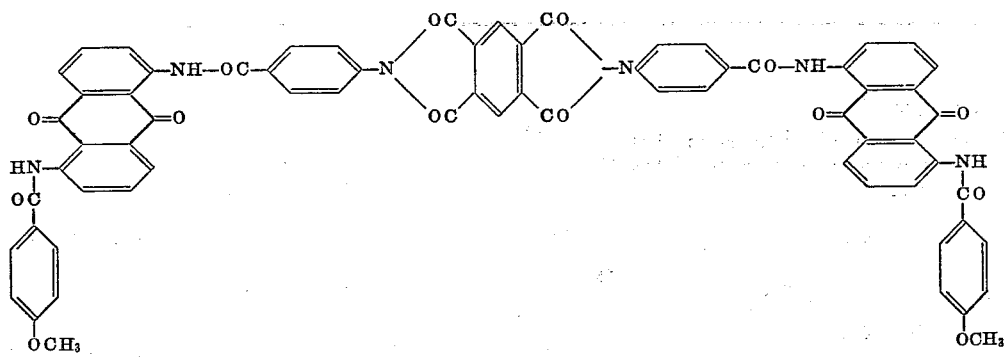

References Cited
UNITED STATES PATENTS
2,741,621  4/1956  Moergeli et al. ____ 260—307.5

NICHOLAS S. RIZZO, *Primary Examiner.*
J. NARCAVAGE, *Assistant Examiner.*